United States Patent [19]
Haupt et al.

[11] 4,089,394
[45] May 16, 1978

[54] PARK LOCK AND GEAR SHIFT FOR A VEHICLE TRANSMISSION

[75] Inventors: Robert C. Haupt; Donald E. Peterson, both of Wauwatosa, Wis.

[73] Assignee: Allis-Chalmers Corporation, Milwaukee, Wis.

[21] Appl. No.: 750,233

[22] Filed: Dec. 13, 1976

[51] Int. Cl.² .......................... B60L 1/00; B60L 9/00
[52] U.S. Cl. .................................................. 192/4 A
[58] Field of Search ...................................... 192/4 A

[56] References Cited
U.S. PATENT DOCUMENTS

| | | | |
|---|---|---|---|
| 1,933,603 | 11/1933 | Stucatur | 192/4 A |
| 3,373,850 | 3/1968 | Helmer | 192/4 A |
| 3,601,231 | 8/1971 | Kolacz | 192/4 A |
| 3,987,878 | 10/1976 | Hansen | 192/4 A |

*Primary Examiner*—Lloyd L. King
*Attorney, Agent, or Firm*—Arthur L. Nelson

[57] ABSTRACT

A cable and cam operated vehicle park lock and range shift mechanism whereby the linear movements operating the mechanism are transformed into a rotational movement for operating an eccentric cam and a shift fork for operating the park lock and range shift in the transmission.

10 Claims, 12 Drawing Figures

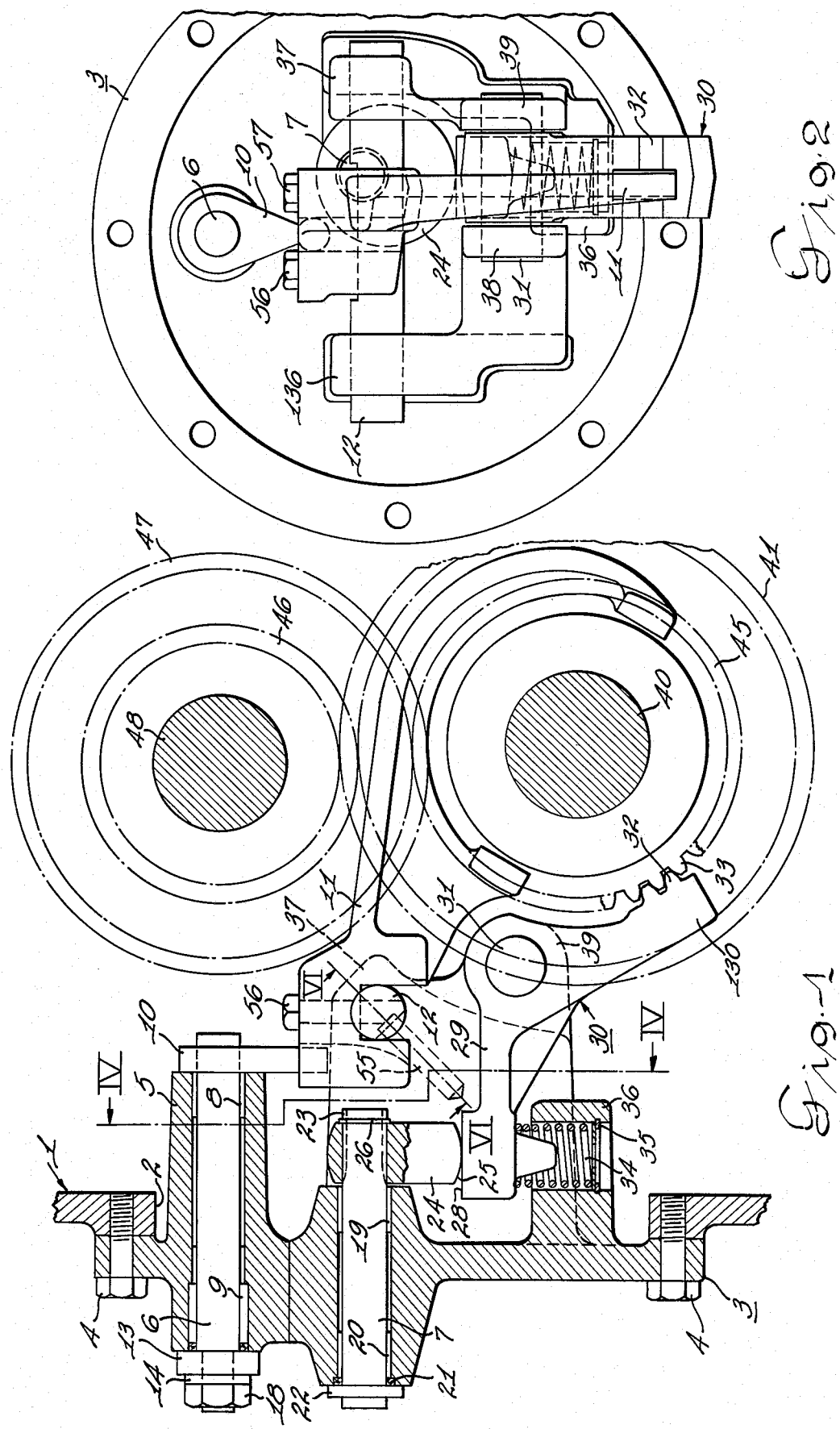

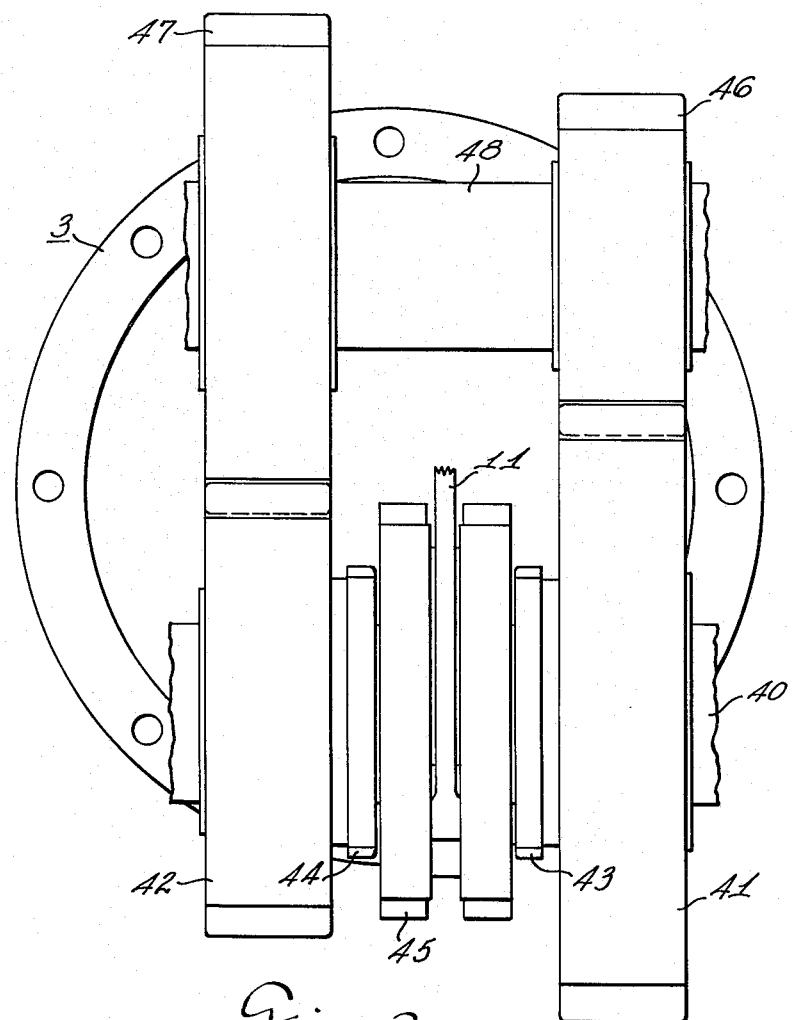
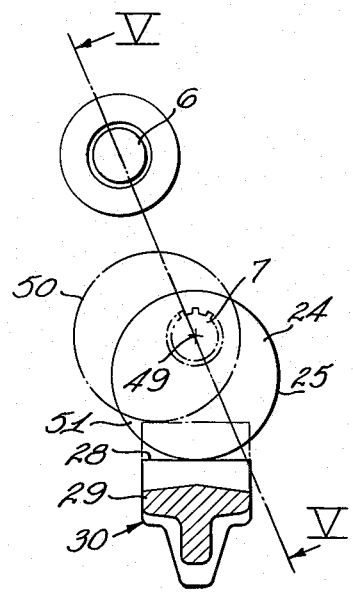
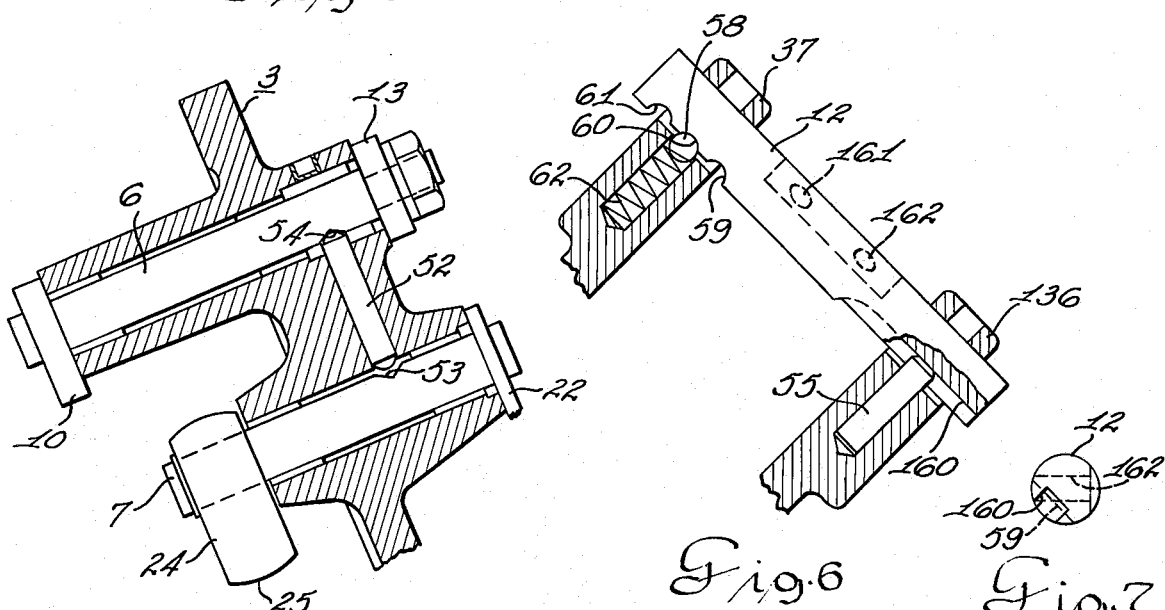

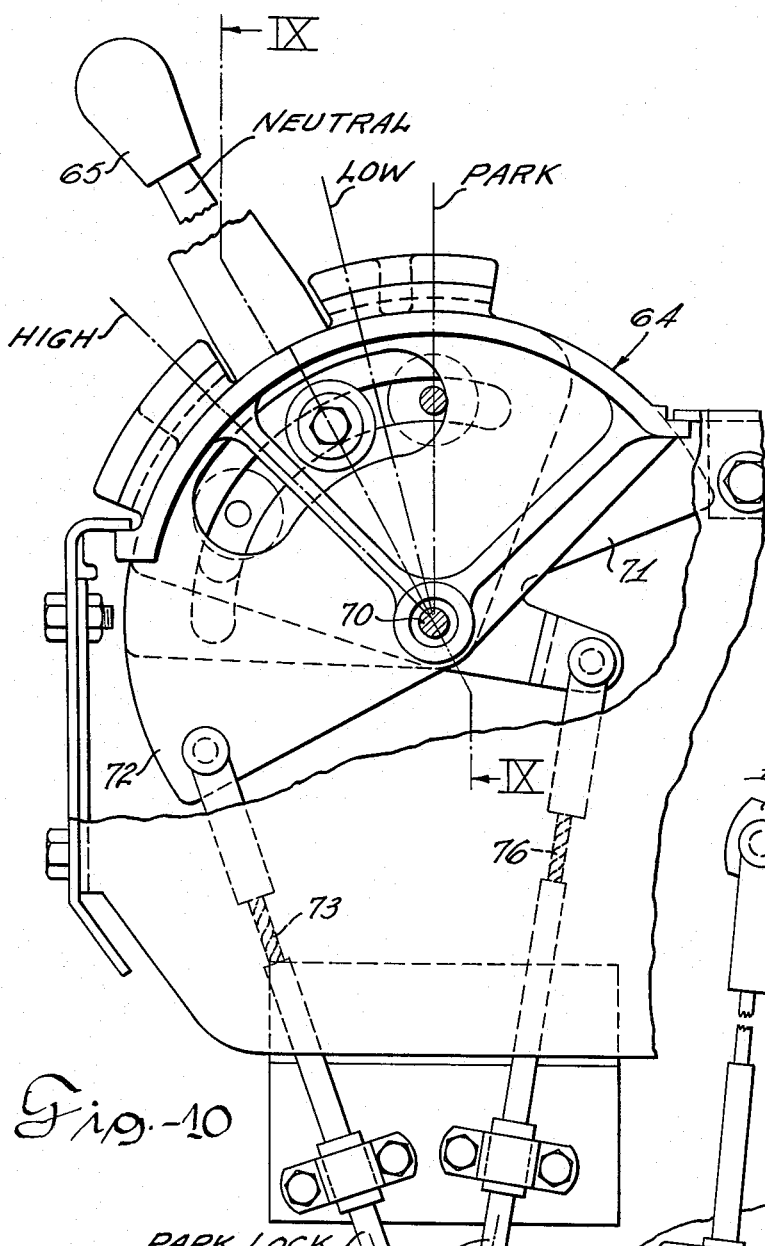
Fig.-10
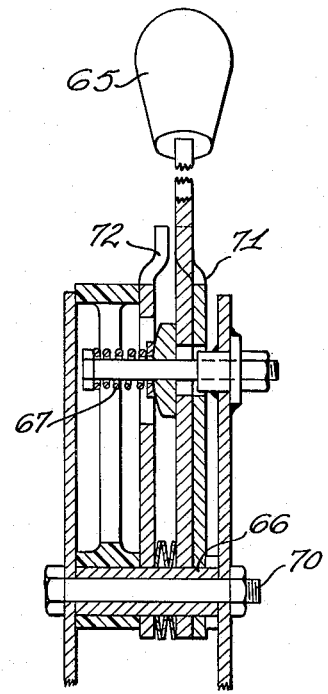
Fig.9
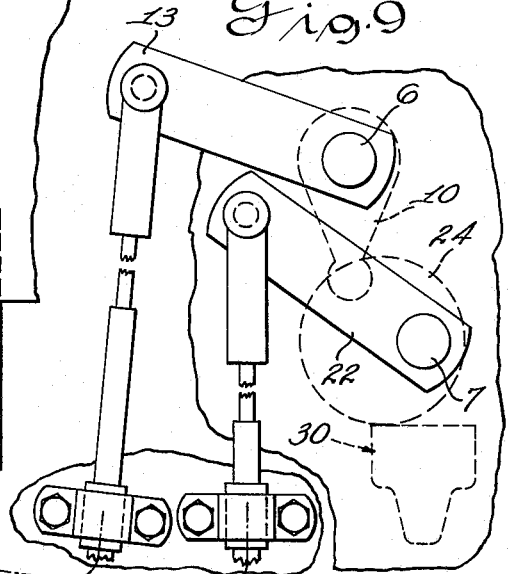
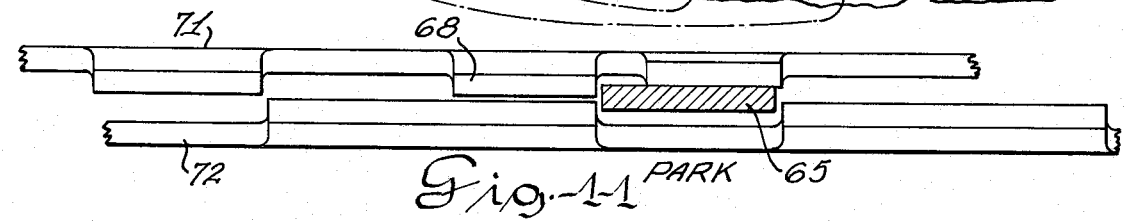
Fig.-11
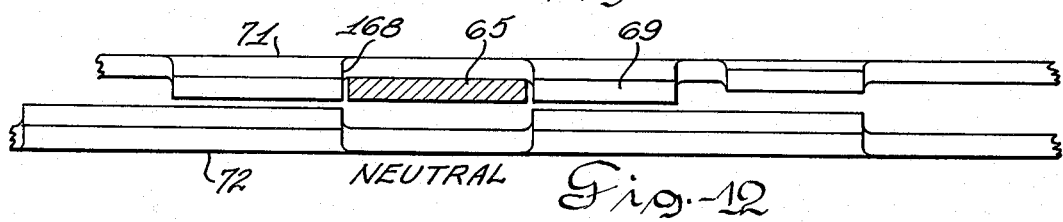
Fig.-12

PARK LOCK AND GEAR SHIFT FOR A VEHICLE TRANSMISSION

This invention relates to a transmission and more particularly to a means whereby forces causing reciprocal movements are transformed into rotational movements to operate an eccentric cam for the park lock and a shift rail for selectively operating the range shift in a vehicle transmission.

The conventional vehicle transmission is operated by a shift lever at the operator station. A suitable linkage is provided between the shift lever and the transmission for shifting of the gears to provide a desired speed ratio for the operator. When parking and shifting is accomplished with a single lever as is sometimes done in automobiles the gears cannot be shifted while the vehicle is in the park lock position. When the operator station is resiliently mounted relative to the vehicle chassis, there is relative movement between the operator and the controls at the operator station relative to the vehicle chassis. A linkage which accommodates the relative movement between the operator station and the vehicle chassis must be used to provide force and motion transmission from the shift lever at the operator station for shifting gears or operating the park lock.

The modern tractor may employ a five speed main transmission preceded by a two or three speed power shift transmission which multiplies the range of the main transmission. Similarly, a range transmission may be positioned subsequent to the main transmission which also in turn multiplies the speed ratios of the main transmission. The provision of the power shift transmission and the range transmission provides a more versatile power transmission for the overall tractor power train.

Generally, the range transmission is positioned rearwardly and remote of the operator station. Accordingly, some form of linkage must be provided to accommodate the relative movement between the operator station and the range transmission as well as allowing for the remote location of the range transmission relative to the operator. Accordingly, this invention provides such a vehicle park lock and range shift transmission in which the operator can control shifting of the range transmission and operating the park lock which locks the drive shaft of the vehicle and which can be accomplished from the operator station.

Accordingly, it is an object of this invention to provide a cable operated vehicle park lock and range transmission shift mechanism.

It is another object of this invention to provide a rotary eccentric cam operated park lock mechanism.

It is further object of this invention to provide a rotary operated shaft for operating a shift rail and a shift fork in a vehicle range shift and a rotary operated shaft operating a park lock with an interlock connected between the rotary shafts for selectively and alternatively operating the range shift or the park lock mechanism.

The objects of this invention are accomplished by providing a vehicle transmission having a cover plate for supporting two rotating shafts for operating the range shift and the park lock mechanisms. The rotating shafts are rotatably mounted on the cover plate for the transmission and can be operated by suitable reciprocating force transmission means from the operator station to the cover plate. One of the rotating shafts in turn operates a shift operating arm engaging a shift rail carrying a shifting fork for shifting a two speed range shift. The second of the rotating shafts operates an eccentric cam bearing against the cam follower arm operating a pawl arm of a lever pivotally mounted for selective engagement of the pawl with the drive shaft gear for locking the vehicle drive shaft. An interlock is provided to selectively operate either the park lock or the range shift mechanism and preventing operation of the other mechanism. The transmission can be remotely positioned relative to the operator station.

Referring to the drawings, the preferred embodiment of this invention is illustrated.

FIG. 1 illustrates a cross section view of the transmission viewing parallel with the drive shaft;

FIG. 2 is a side elevation view of the vehicle transmission shift and park lock mechanism without the gears of the transmission;

FIG. 3 is a side elevation view of the transmission showing the gears of the transmission and the shift fork for operating the clutch collar;

FIG. 4 is a cross section view taken on line IV—IV of FIG. 1;

FIG. 5 is a cross section view taken on line V—V of FIG. 4;

FIG. 6 is a cross section view taken on line VI—VI of FIG. 1;

FIG. 7 is an end view of the shaft shown in FIG. 6;

FIG. 9 is a cross section view taken on line IX—IX of FIG. 10;

FIG. 10 is a side elevation view of a control console and cables for operating a park lock and range shift mechanism shown in FIG. 1;

FIG. 11 is a developed view showing the top of the control console showing the operation of the range shift and park lock lever with the lever in the park lock position; and FIG. 12 is a similar view with the shift lever in the neutral position.

Figure 8:
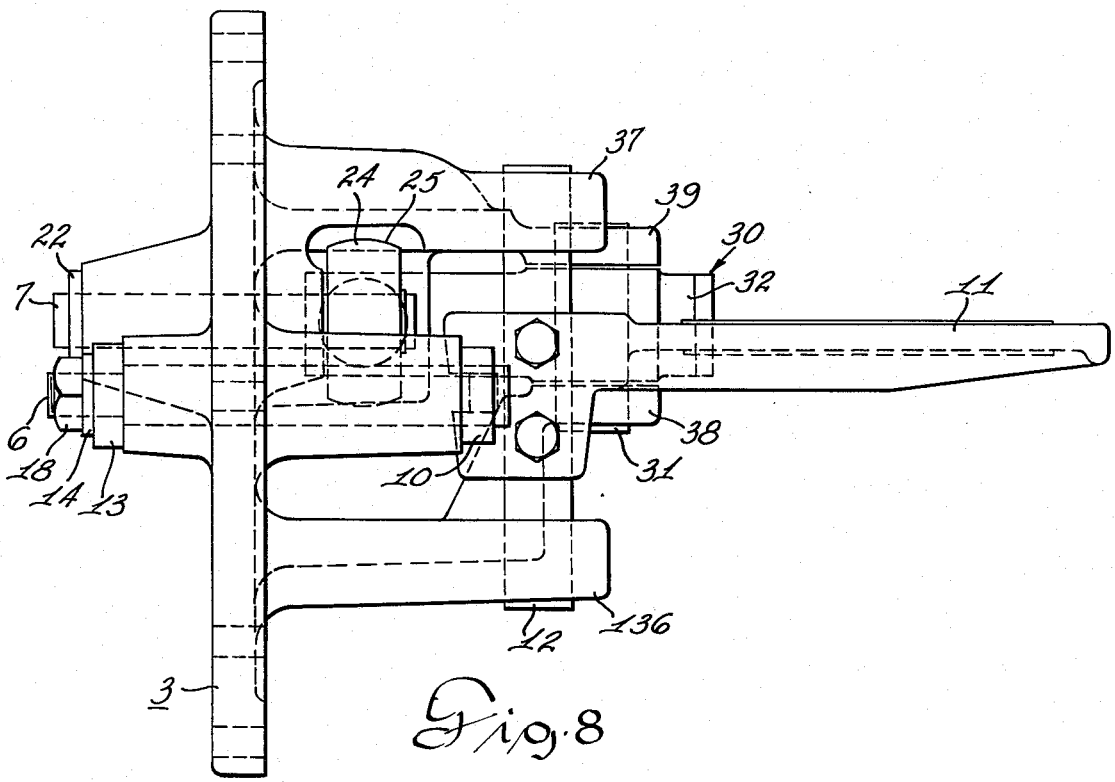
FIG. 8 is a top view of the gear shift and park lock mechanism.

Referring to the drawings, FIG. 1 shows a cross section view through an opening 2 on the vehicle transmission 1. The cover plate 3 is bolted to the transmission housing by a plurality of bolts 4. The cover plate 3 forms a bearing casing 5 for the range shift operating shaft 6 and the park lock operating shaft 7. The bearing casing 5 supports the bearing 8 and bearing 9 which rotatably support the gear shift operating shaft 6. The gear shift operating shaft 6 extends through the gear shift arm 10 for pivotally moving the gear shift arm for slideably moving the shifting fork 11 on the shift rail 12. The gear shift operating arm 13 is connected to the outer end of the gear shift operating shaft 6 and is firmly fastened by the lock washer 14 and the nut 18 on the threaded end of the gear shift operating shaft 6. The shift fork 11 slides with the shift rail 12 to shift the clutch collar and drive gear 45.

The park lock operating shaft 7 is rotatably mounted on the bearings 19 and 20. The park lock operating shaft carries the oil seal 21 which is locked in by the lever 22 on the outer end of the park lock operating shaft 7. The other end of the park lock operating shaft is formed with a spline 23 which engages a mating spline of the eccentric roller 24. The eccentric roller forming the cam surface 25 is locked into position by a retainer ring 26. The eccentric roller 24 defining the cam 25 bears against a follower surface 28 on the actuator arm 29 of the pawl lever 30. The pawl lever 30 is pivotally mounted on a shaft 31 mounted in supporting structure of the cover plate 3. The pawl lever 30 defines a gear segment 32 on the pawl arm 130 to engage the gear teeth 33 of the clutch collar and drive gear 45. The clutch collar and drive gear 45 are connected through the spline to the drive shaft 40 of the vehicle.

The actuator arm 29 of pawl lever 30 is biased to a release position of the pawl arm 130 by the spring 34. The spring 34 is mounted on the spring seat 35 in the spring support 36.

Integral with the cover plate 3 are the supporting flanges 136 and 37 which slideably support the shift rail 12. These flanges also form the supports 38 and 39 which carry the shaft 31 pivotally mounting the pawl lever 30.

The structure is shown in FIGS. 1 and 2 as well as FIG. 8 which shows a plan view of the cover plate and the supporting flanges carrying the shaft 31 supporting the pawl lever 30 and shift. The gear shift operating shaft 6 and the park lock operating shaft 7 are shown in FIG. 8. The mounting of the eccentric roller 24 is shown on the end of the shaft 7.

Referring to FIG. 3, the drive shaft 40 is shown supporting the gears 41 and 42. Each of the gears 41 and 42 carry clutch teeth 43 and 44 as indicated. The clutch collar 45 is splined at its internal periphery and slideably engages the clutch teeth 43 and 44 of the gears 41 and 42, respectively, when the shift fork 11 is shifted. The drive gears 46 and 47 are carried on the input shaft 48 for selectively driving either gear 41 or 42. The gears are in constant engagement with each other except the drive may go through gear 46 and gear 41 or gear 47 and gear 42 selectively and alternatively depending upon the position of the clutch collar 45.

FIG. 4 illustrates the operation of the eccentric roller 24 which defines the cam surface 25. As the park lock operating lever 22 is rotated, the cam rotates about the axial center 49 of the park lock operating shaft 7. This in turn moves the eccentric roller 24 from the position 50 to the position 51. The position 50 shows the release position of the cam and position 51 shows the actuated position in which the park lock is engaged.

FIG. 5 shows an interlock pin 52. The interlock pin 52 is moved to the position shown in FIG. 5 when the park lock actuating shaft 7 is rotated. The recess 53 rotates beyond the end of the interlock pin 52 and the periphery of the shaft 7 presses the pin into the recess 54 of the gear shift operating shaft 6. Conversely, when the gear shift operating shaft 6 is rotated, the recess 54 rotates beyond the end of the pin and the periphery of the shaft forces the pin 52 into the recess 53 on the park lock operating shaft 7. Accordingly, the park lock cannot be engaged while the range shift is operating in either the high or the low gear range position. When the park lock is engaged, the transmission cannot be shifted in either of the high or low ranges.

The shift rail 12 carries the gear shift fork 11 which is nonrotatably mounted on the shift rail 12. The shift fork is fastened to the shift rail by the bolts 56 and 57. The slot 160 slideably receives the pin 55 mounted in flange 136.

The high, low and neutral positions of the shift rail are provided. The detent element 58 seats in the high, neutral and low detent positions 59, 60 and 61. The detent element 58 is biased to engaged position by the spring 62. The end view of the shift rail is shown in FIG. 7.

Referring to FIGS. 9, 10, 11 and 12, the control console 64 is shown. The lever 65 is pivotally mounted on the sleeve 66. The spring 67 normally biases the lever 65 against the shift segment 71. The shift lever 65 is shown in the park lock position with the lever 65 abutting against the tab 68 as shown in FIG. 11. When the lever is moved to the left against the biasing force of spring 67, it can be moved forwardly to the slot 168 showing the neutral position for the lever 65. The range shift segment 69 can also be shifted forward or reverse to operate the range shift segment. The range shift transmission can be shifted from high to low by movement of the shift segment 69.

The park lock and range shift mechanism operates in the following described manner. The lever 65 is pivotally mounted on the sleeve 66 which is supported on the shaft 70. The lever can be shifted by selectively engaging the range shift segment 71 or the park lock segment 72. This is accomplished by moving the lever left or right as viewed in FIG. 9. The range shift segment 71 is in the gear shifting segment and the shift lever can be pivotally moved between the high, low and neutral positions as shown in FIG. 10. Movement of the cables by the segments operate the levers for shifting the range transmission or the park lock. As the park lock segment 72 is moved clockwise as viewed in FIG. 10, the cable 73 pivots the lever 22 in a counterclockwise direction which in turn operates the cam 24. The cam is rotated in a counterclockwise direction which depresses the actuator arm 29 of the pawl lever 30 as the cam bears against the surface 28. The park lock lever is in the fully actuated position as shown in FIGS. 1 and 2. The lever then is moved to the position shown in FIG. 11 in which the lever is locked to prevent it from counterclockwise rotation while the park lock is engaged.

Simultaneously, the interlock pin 52 will move to the position as shown in FIG. 5 in which the pin is received in the recess 54 locking the gear shift operating shaft 6 from moving while the park lock is engaged. Similarly, when the park lock mechanism is released, the lever is moved to the left as viewed in FIG. 9 and rotated in a counterclockwise direction as viewed in FIG. 10. This releases the park lock as the cam rotates in a clockwise direction as viewed in FIG. 2. The lever 65 is then returned to the neutral position as shown in FIG. 12. In this position, the lever 65 can then be rotated clockwise or counterclockwise to shift the range shift to a low position or a high position as shown in FIG. 10. Movement of the lever 65 rotates the range shift segment 69 and also transmits motion through the cable 76 whereby a clockwise rotation of the lever 65 will cause a counterclockwise rotation of the shift lever 13 and moves the shift arm 10. This, in turn, moves the shifting fork 11 as shown in FIG. 2. Accordingly, shifting in the opposite direction will carry the range shift segment 69 and shift the arm 13 and gear shift arm 10 in the opposite direction and move the shifting fork to shift the gears into high range. Likewise, the interlock pin 52 will move into the recess 53 as the gear shift operating shaft 6 is rotated and thereby prevent any movement of the park lock to lock the drive shaft when the gears are shifted.

The embodiments of the invention in which an exclusive property or privilege is claimed are defined as follows:

1. A park lock and range shift mechanism on a transmission comprising, a transmission housing, a transmission housing cover mounted on the side of the transmission housing, a park lock operating shaft defining a pivotal axis pivotally mounted in said housing cover, a cam defining a surface eccentric with said pivotal axis connected to said park lock operating shaft, a park lock lever including a cam follower arm and an arm having a gear segment for locking a drive shaft pivotally mounted on said housing cover, a gear shift operating shaft defining a pivotal axis pivotally mounted in said housing cover, a shift rail carrying a gear shifting fork slideably mounted in said housing cover, a gear shift arm on said gear shift operating shaft for slideably operating said shifting fork in said transmission, a park lock operating arm on said park lock operating shaft pivoting said park lock operating shaft, a shift operating arm mounted on said gear shift operating shaft rotating said gear shift operating shaft for slideably operating said shifting fork, a spring release normally biasing said park lock lever to a release position, an interlock pin positioned between said park lock operating shaft and said gear shift operating shaft selectively moving to an interlock position to prevent rotation of one of said shafts while the other of said shafts is pivoted, control means for selectively rotating said gear shift operating arm or said park lock operating arm to thereby shift said range shift transmission or operate said park lock mechanism in said transmission.

2. A park lock and range shift mechanism for a transmission as set forth in claim 1 wherein said cam follower arm defines a planar surface for engaging said eccentric cam for operating said pawl arm and engaging said park lock mechanism.

3. A park lock and range shift mechanism for a transmission as set forth in claim 1 including a slide rail supporting said shifting fork, a detent means for selectively defining a low, a high and a neutral position for said gear shift mechanism.

4. A park lock and range shift mechanism as set forth in claim 1 wherein said cam defines an arrangement for locking said cam and said park lock pawl when said park lock is fully engaged.

5. A park lock and range shift mechanism for a transmission as set forth in claim 1 wherein said cam defines a cylindrical surface, neams for eccentrically mounting said cam on said park lock operating shaft for thereby operating said pawl lever when said park lock is engaged.

6. A park lock and range shift mechanism for a transmission as set forth in claim 1 wherein said pawl arm of said park lock lever defines a gear segment for selectively engaging a gear on the drive shaft of the vehicle.

7. A park lock and range shift mechanism for a transmission as set forth in claim 1 wherein said shifting fork includes means for engaging a clutch collar for selectively reciprocating a clutch sleeve for shifting said range shift transmission into a high or low gear range.

8. A park lock and range shift mechanism for a transmission as set forth in claim 1 including means for positioning said arms for operating said park lock operating shaft and said gear shift operating shaft to apply a torque on said arms for operating the park lock and range shift mechanism.

9. A park lock and range shift mechanism for a transmission as set forth in claim 1 including a transmission housing cover in said transmission housing means for supporting said park lock operator shaft and said range shift operator shaft.

10. A park lock and range shift mechanism for a transmission as set forth in claim 1 including means supporting said gear shift operating shaft and said park lock operating shaft in a position normal to the actuating force for operating said park lock mechanism and said range shift mechanism for selectively and alternatively operating said mechanism by rotating one of said shafts.

* * * * *